United States Patent
Honzek

(10) Patent No.: US 6,386,310 B2
(45) Date of Patent: May 14, 2002

(54) STEERING DEVICE, ESPECIALLY FOR FARMING TRACTORS AND SIMILAR COMMERCIAL VEHICLES

(75) Inventor: Robert Honzek, Oberthingau (DE)

(73) Assignee: AGCO GmbH & Co. (DE)

( * ) Notice: Subject to any disclaimer, the term of this patent is extended or adjusted under 35 U.S.C. 154(b) by 0 days.

(21) Appl. No.: 09/854,742

(22) Filed: May 14, 2001

(30) Foreign Application Priority Data

Jun. 23, 2000 (GB) .............................................. 0015302

(51) Int. Cl.[7] ................................................ B62D 5/22
(52) U.S. Cl. ........................ 180/380; 180/417; 180/428; 180/437; 180/438; 180/440; 180/253
(58) Field of Search ......................... 180/417, 78, 400, 180/408, 414, 420, 418, 419, 428, 432, 434, 435, 436, 437, 438, 439, 440, 233, 252, 253, 254, 337, 347, 348, 349, 353, 354, 359, 360, 377, 378, 379, 380, 381, 382

(56) References Cited

U.S. PATENT DOCUMENTS

| 4,319,654 A | * | 3/1982 | Ujita ........................... 180/435 |
| 4,533,010 A | * | 8/1985 | Harder ......................... 180/41 |
| 4,597,468 A | * | 7/1986 | Friedrich ..................... 180/255 |
| 5,129,474 A | | 7/1992 | Rauter et al. ........... 180/417 X |
| 5,236,061 A | * | 8/1993 | Haupt ..................... 180/381 X |

* cited by examiner

Primary Examiner—J. J. Swann
Assistant Examiner—F. Zeender
(74) Attorney, Agent, or Firm—MacMillan, Sobanski & Todd, LLC

(57) ABSTRACT

A steering device comprises a rigid steering axle (12) pivotable about a substantially horizontal axis, the wheels (5) of which are driven by a cardan shaft (4) arranged between the steering axle and the transmission (2) the transmission being spaced apart from the steering axle, comprising a power steering gear (22) actuatable by a steering wheel (14) and a steering shaft (23), the power steering gear having a pinion (30), which is connected with the steering linkage of the steering axle, and comprising a steering cylinder being an integral part of the steering linkage, the steering cylinder being actuatable by fluid under pressure supplied by the power steering gear, characterized in that a steering cylinder (21) is positioned coaxially with respect to the cardan shaft (4), the steering cylinder being connected with the steering axle (12) and comprising a hollow piston rod (28) to receive the cardan shaft (4), and that a first toothed rack (29) of the piston rod of the steering cylinder is in driving connection with the pinion (30) of the power steering gear (22) and a second toothed rack (35, 42) of the piston rod of the steering cylinder is in driving connection with the steering linkage (37, 38, 39, 40, 41) of the steering axle (12).

13 Claims, 3 Drawing Sheets

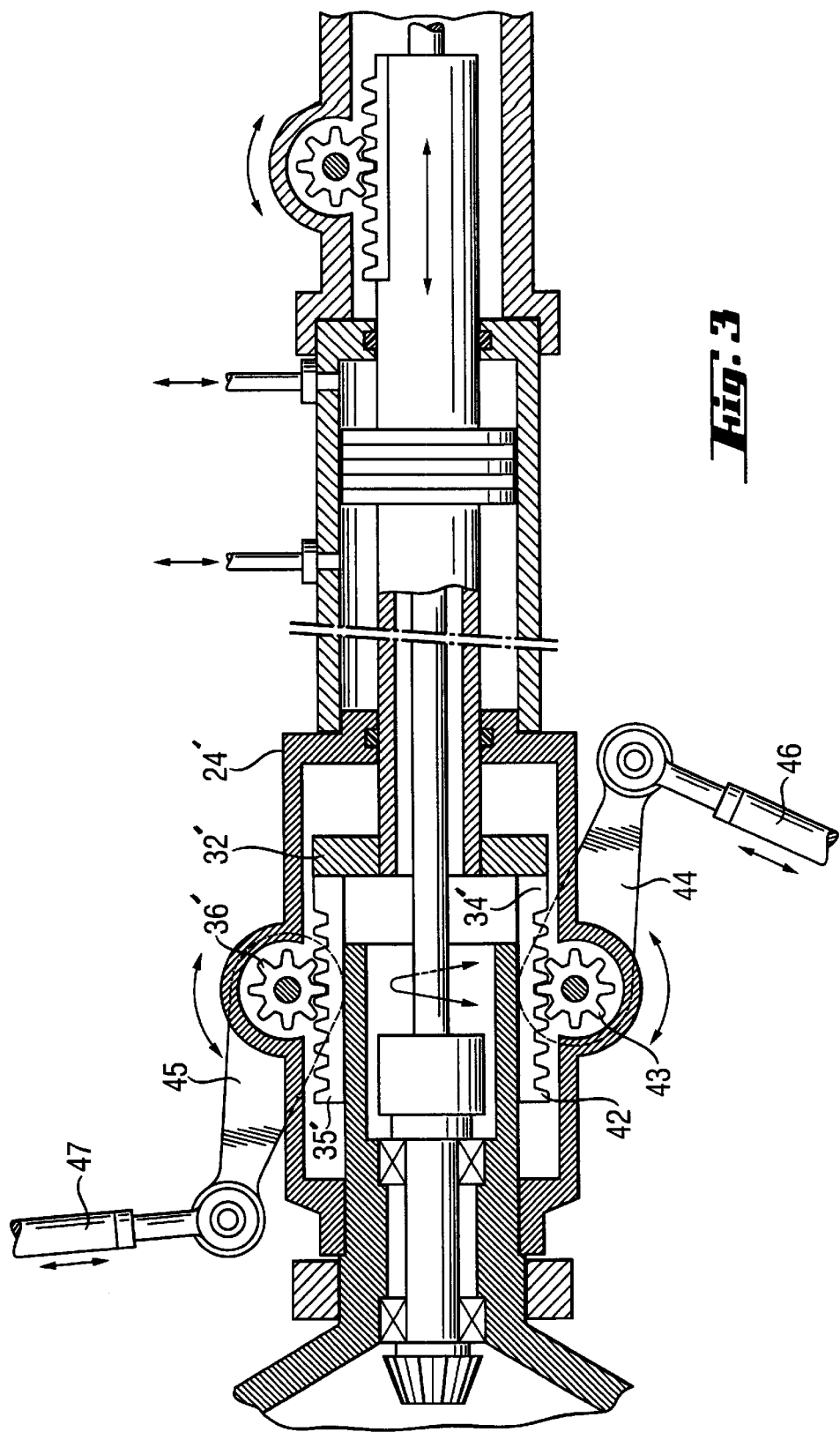

STEERING DEVICE, ESPECIALLY FOR FARMING TRACTORS AND SIMILAR COMMERCIAL VEHICLES

BACKGROUND OF THE INVENTION

The invention relates to a steering device, especially for agricultural tractors and similar commercial vehicles having a rigid steering axle movable in a pendulum fashion around a pendulum pin, the pendulum pin being arranged in line with the longitudinal central axis of the tractor, the wheels of which are driven by a cardan shaft arranged between the steering axle and the transmission the transmission being located with distance behind the steering axle, comprising a power steering gear having a pinion, which is connected with the steering linkage of the steering axle, and comprising a steering cylinder being an integral part of the steering linkage, the steering cylinder being actuatable by fluid under pressure supplied by the power steering gear.

Commercial vehicles having a construction to allow a maximum speed of more than 62 km/h have to have steering devices including a mechanical connection throughout from the steering wheel to the directed wheels. Such a steering device known from DE-AS 12 88 930 is hydraulically power assisted but can be controlled in emergency steering using increased steering forces when the power steering fails.

Farming tractors having a construction for a maximum speed below the limit described above at present are designed including pure hydraulic steering devices. The reason for this was the fact that there was not enough room to arrange a mechanical steering device as used before extending from the steering wheel to the steering axle being positioned far in front of the steering wheel. The only solution was to use the room beside the driving engine above the steering axle. However, this arrangement greatly limits the possible angle of the steering action. Hydraulic steering devices include a power steering gear operated by the steering wheel supplying hydraulic liquid under pressure to the power steering cylinder. The power steering cylinder, as known from DE-AS 1 21 724, is arranged parallel to the body of the steering axle and connected with the steering linkage of the steering axle. This arrangement, particularly in view of the large dimensions of the steering cylinder, require substantial room for its positioning. This hinders the construction as far as the room is needed to position other essential elements of the tractor such as the front power take-off shaft, power lift elements, axle suspension elements for example.

SUMMARY OF THE INVENTION

It is the object of the invention to provide a steering device being adapted to farming tractors and other commercial vehicles having a construction to allow a maximum speed of more than 50 km/h.

This is attained by the features of patent claim 1.

Using a steering cylinder having two chambers with the same cross section and positioning it in a region between the steering axle and the transmission gives the possibility to use the space already housing the cardan shaft for driving the front wheels. Thus, this room is used for two purposes. Furthermore, the invention allows the piston rod to serve two purposes. First, the piston rod serves to transmit the power force generated by the hydraulic fluid acting on the piston to the steering linkage of the steering axle. Second, there always is a mechanical connection from the power steering gear to the steering linkage. Futhermore, there is more room to be used to position other essential elements as the front power take-off shaft, power lift elements, axle suspension elements in the region of the steering axle and, sensitive parts of the steering cylinder as the piston rod and the conduits are positioned in the interior and thus protected against damage.

Design of the region around the steering wheel in the cabin is simpler and more economical, since the power steering gear no longer needs to be positioned in this region.

The features of claim 3 facilitate use of the invention on vehicles having a suspended steering axle.

The subject of claims 4 to 8 is a useful arrangement of the power steering cylinder being part of the steering linkage of the steering axle.

The features of claim 9 can be used on vehicles including a cardan shaft for driving the front wheels. The cardan shaft being positioned in the interior of piston rod is protected from damage and dirt.

A very simple design of the steering device is subject of claim 10.

The power steering gear according the features of claim 11 allows the steering device to have substantially shortened conduits.

BRIEF DESCRIPTION OF THE DRAWINGS

The invention can be better understood with reference to the following drawings. Advantageous details and characteristics of the invention are described in the following.

FIG. 3 is a top view of a steering device adapted to a steering axle having two track rods.

DETAILED DESCRIPTION

Figure 1:
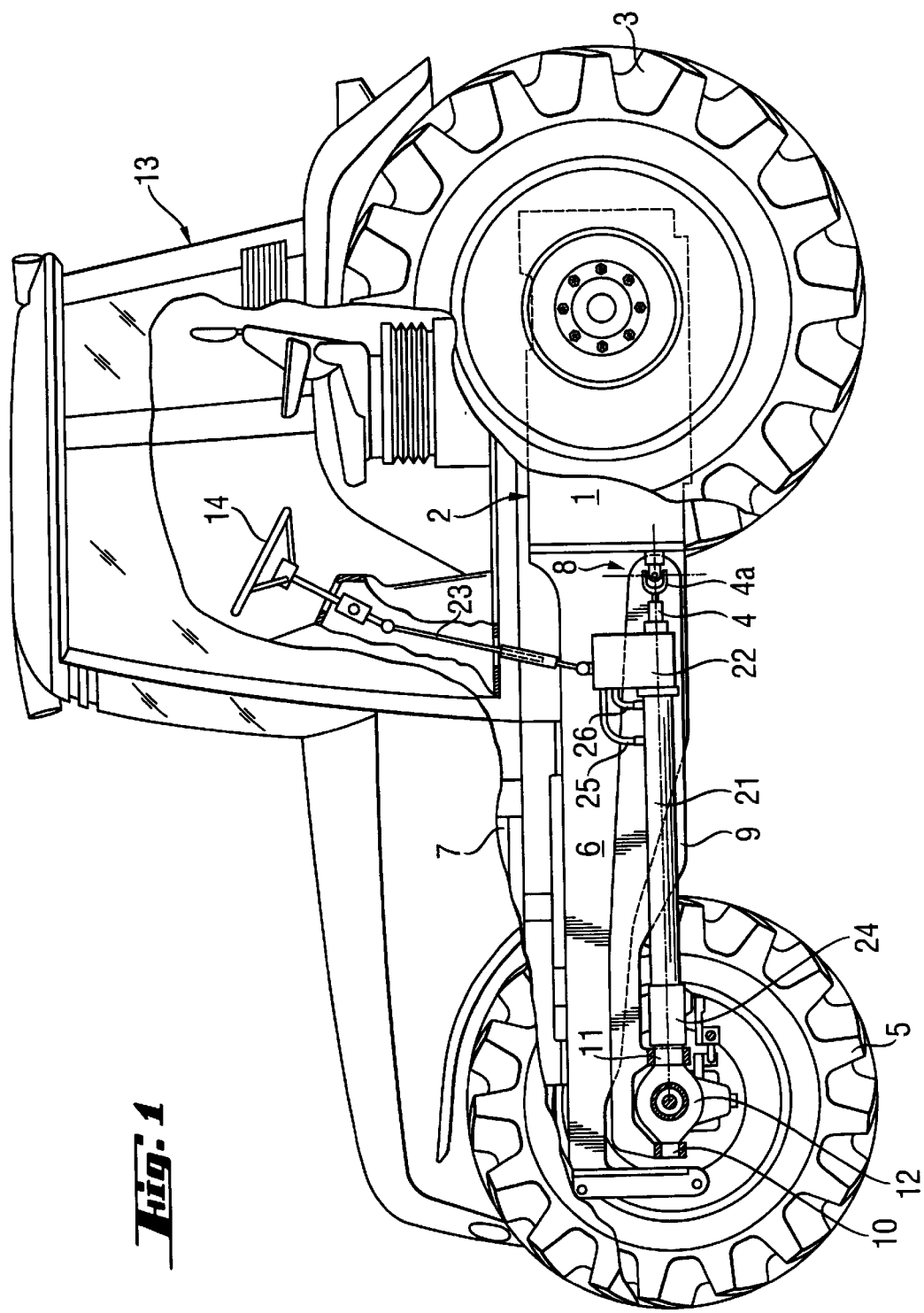
FIG. 1 is a schematic side view of a farming tractor with a steering axle having a steering device.

The agricultural tractor illustrated in FIG. 1 includes a housing 1 and a transmission 2 arranged therein. The transmission 2 contains a infinitely variable change-speed gear driving the rear wheels 3 and the front wheels 5 via an all wheel drive clutch arranged in the housing 1 and via a cardan shaft 4. Two frames 6 are connected with the housing 1 and extend longitudinally in the direction to the front of the tractor. The frames 6 carry the driving motor 7 of the tractor. Bearings 8 are located in the region of the frames 6 directed to the rear. The bearings 8 serve to carry a swinging arm arrangement 9 extending to the front. The swinging arm arrangement 9 has two swinging arms spaced apart laterally and connected to each other towards the front of the tractor. The swinging arms are arranged in alignment with the joint 4a of the cardan shaft 4. Pendulum pins 10 and 11 of the axle 12 are supported on the front part of the swinging arm arrangement 9. The swinging arm arrangement 9 includes elastic elements (not shown) and serves to buffer shocks from the steering axle 12 to the frames 6. A cabin 13 including a steering wheel 14 is positioned behind the driving motor 7 being located on the housing 1.

Figure 2:
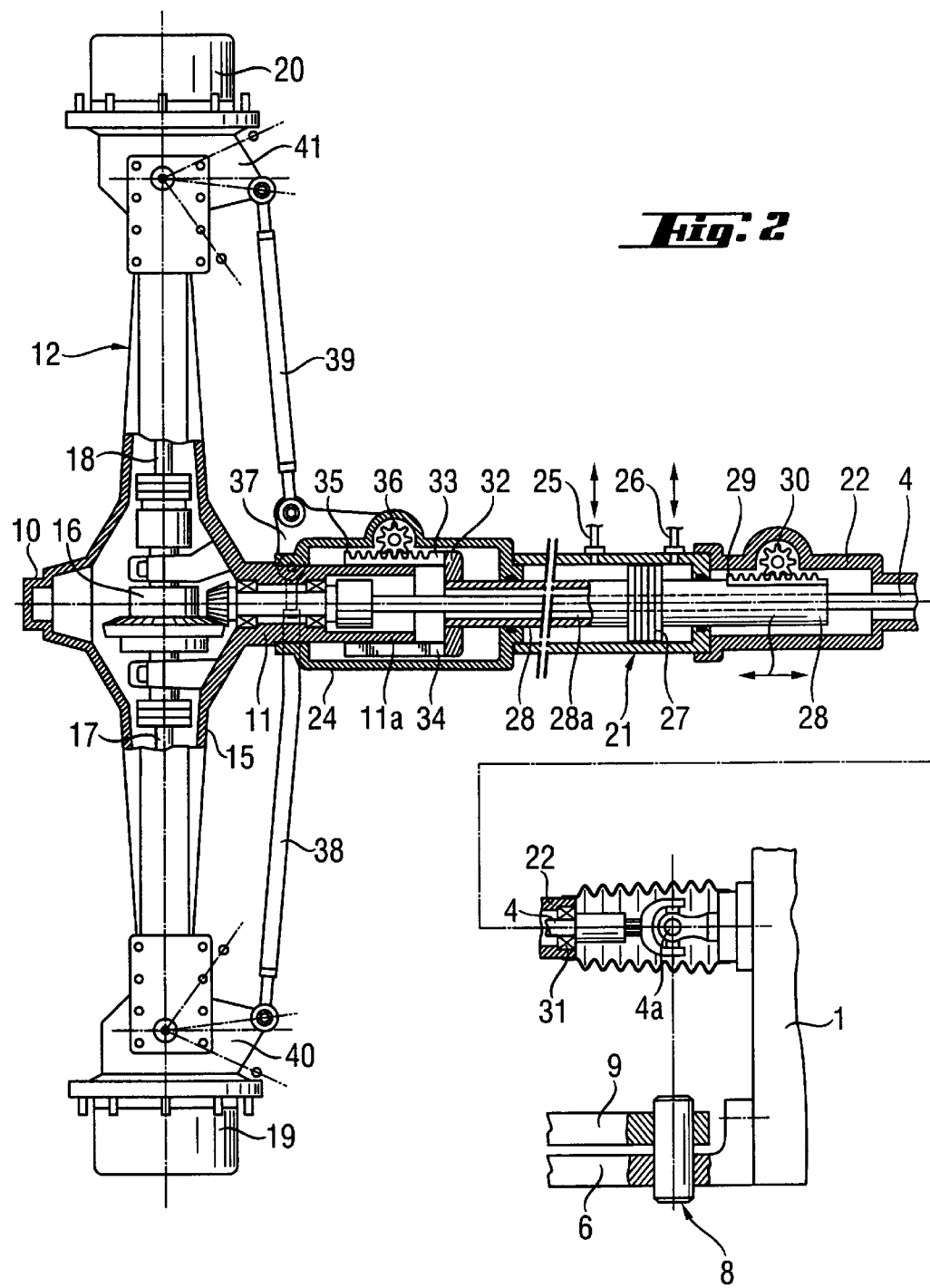
FIG. 2 is a top view of the steering device of FIG. 1 adapted to a steering axle having a split track rod.

As illustrated in FIG. 2, the cardan shaft 4 is in driving connection with a differential gear 16 arranged in the middle of a body 15 of the steering axle 12. Two front half axle shafts 17 and 18 extend from the differential gear 16 to the hubs 19 and 20 respectively, which carry the front wheels 5.

The front wheels 5 can be pivoted by a steering device to change the driving direction of the tractor. The steering device includes a steering cylinder 21 having two chambers with the same cross section, a power steering gear 22, the steering wheel 14, and a steering shaft 23 connecting the steering wheel 14 with the power steering gear 22.

Both the steering cylinder 21 and the cardan shaft 4 extend along the longitudinal axis of the tractor. The steering cylinder 21 and the cardan shaft 4 are positioned between the housing 1 of the transmission 2 and the steering axle 12. The pendulum pin 1 has a projection 11 a carrying a tube-like extension piece 24 fixed thereon. The steering cylinder 21 is connected to the steering axle 12 by this extension piece 24.

Turning the steering wheel 14 supplies liquid under pressure from the power steering gear 22 via the conduits 25 or 26 respectively to the steering cylinder 21. If the tractor has a housing 1 extending extremely towards the front of the tractor, the power steering gear 22 can be positioned in the interior of a tank containing the hydraulic liquid and being part of the housing 1. Thus, the conduits have a short length and are arranged under protection of the tank and the housing respectively.

A piston 27 is located in the steering cylinder 21 between the inlets of the conduits 25 and 26. The piston 27 includes a piston rod or piston rods 28 on both sides of the piston. The piston rod 28 has an axial bore 28a through which the cardan shaft 4 extends from the housing 1 to the differential gear 16.

The end region of the piston rod 28 towards the housing 1 is provided with a toothed rack 29. A pinion 30 of the power steering gear 22 meshes with the toothed rack 29. The power steering gear 22 is arranged on the steering cylinder 21 in order to facilitate co-operation between the pinion 30 of the power steering gear 22 with the toothed rack 29 of the piston rod 28 independent from any movements of the steering cylinder 21. The steering shaft 23 is designed telescopely with variable length to make relative movements of the power steering gear 22 with respect to the steering wheel 14 possible due to spring and pendulum movements of the steering axle 12. The power steering gear 22 and the steering cylinder 21 are supported by a bearing 31 on the cardan shaft 4.

The end part of the piston rod 28 facing the steering axle 12 extends into the extension piece 24 and includes a projection piece 32 having two fingers 33, 34 being arranged with respect of 180° to each other and being guided in a longitudinal groove (not shown) of the projection 11a of the pendulum pin 11. The finger 33 includes a toothed piece 35. A pinion 36 is located in the extension piece 24 and meshes with the toothed piece 35. The pinion 36 is connected with a lever 37. The free ends of the lever 37 are connected with two track rods 38 and 39 which are jointly connected with the two track rod levers 40 and 41 respectively of the steering axle 12.

Actuating the steering wheel 14 turns the shaft 23, which drives the power steering gear 22. Within the power steering gear 22 the turning movement of the steering shaft 23 is mechanically transferred to the pinion 30. The pinion 30 displaces the piston rod 28 by meshing with the toothed rack 29 in a direction depending on the direction in which the steering wheel 14 is turned. At the same time the power steering gear 22 supplies power steering force by liquid under pressure via one of the conduits 25 or 26 respectively acting on the piston 27 and on the toothed rack 29 also in the same direction as the pinion 30. This movement is transmitted from the pinion 36, to the lever 37 and further to the track rods 38 and 39 and to the track rod levers 40 and 41 and the hubs 19 and 20 carrying the front wheels 5.

The embodiment of FIG. 3 differs from the embodiment of FIG. 2 only in the fact that the finger 34' is provided with a toothed piece 42. The toothed piece 42 meshes with a pinion 43 located on the extension piece 24'. Each pinion 36', 43 is connected with a lever 44 and 45 respectively, to which track rods 46 and 47 are connected being jointly connected with the track rod levers 40 and 41 respectively.

What is claimed is:

1. A steering device for a tractor comprising a rigid steering axle (12) pivotable about a substantially horizontal axis, the wheels (5) of which are driven by a cardan shaft (4) arranged between the steering axle and a transmission (2), the transmission being spaced apart from the steering axle, comprising: a power steering gear (22) actuatable by a steering wheel (14) and a steering shaft (23), the power steering gear having a pinion (30), which is connected with a steering linkage (37, 38, 39, 40, 41) of the steering axle, and comprising a steering cylinder (21) being an integral part of the steering linkage, the steering cylinder being actuatable by fluid under pressure supplied by the power steering gear, characterized in that the steering cylinder (21) is positioned coaxially with respect to the cardan shaft (4), the steering cylinder being connected with the steering axle (12) and comprising a hollow piston rod (28) to receive the cardan shaft (4), and that a first toothed rack (29) of the piston rod of the steering cylinder is in driving connection with the pinion (30) of the power steering gear (22) and a second toothed rack (35) of the piston rod of the steering cylinder is in driving connection with the steering linkage (37, 38, 39, 40, 41) of the steering axle (12).

2. The steering device of claim 1, characterized in that the power steering gear (22) is firmly connected with the steering cylinder (21) and supported on the cardan shaft (4) by a bearing (31).

3. The steering device of claim 1, characterized in that the steering wheel (14) is in driving connection with the power steering gear (22) by a steering shaft (23) being telescopically variable in the longitudinal direction.

4. The steering device of claim 1, characterized in that the steering cylinder (21) is connected with a body (15) of the steering axle (12) by a tube-like extension piece (24).

5. The steering device of claim 1, characterized in that a projection piece (32) including the second toothed rack (35) is mounted on the end portion of the piston rod (28).

6. The steering device of claim 5, characterized in that the second toothed rack (35) cooperates with a pinion (35) being pivotally mounted in an extension piece (24).

7. The steering device of claim 6, characterized in that the pinion (36) is connected with a lever (37), the lever (37) being pivotally connected with two track rods (38, 39) for steering the steering axle (12).

8. The steering device of claim 7, characterized in that the lever (37) extends substantially in the longitudinal direction of the tractor when the steered wheels (5) are in a straight ahead position.

9. The steering device of claim 1, characterized in that the steering cylinder (21) and the carden shaft (4) are located substantially in the middle of the longitudinal direction of the tractor, the extension piece (24) being arranged on a pendulum pin (11a) of the steering axle (12).

10. The steering device of claim 1, characterized in that the second toothed rack comprises two toothed pieces (35', 42) opposing each other provided on a projection piece (32'), each being connected with a track rod (46, 47) by means of a pinion (36', 43) mounted on an extension piece (24') and by a lever (44, 45).

11. The steering device of claim 1, characterized in that the power steering gear is mounted in a housing of a clutch or of the transmission.

12. The steering device of claim 1, characterised in that the steering cylinder (21) comprises two chambers each having a common cross section.

13. The steering device of claim 1, characterised in that the steering axle (12) comprises a pendulum pin (11a).

* * * * *